(No Model.)
J. MALLON.
SUBSOIL PLOW.
No. 453,887. Patented June 9, 1891.
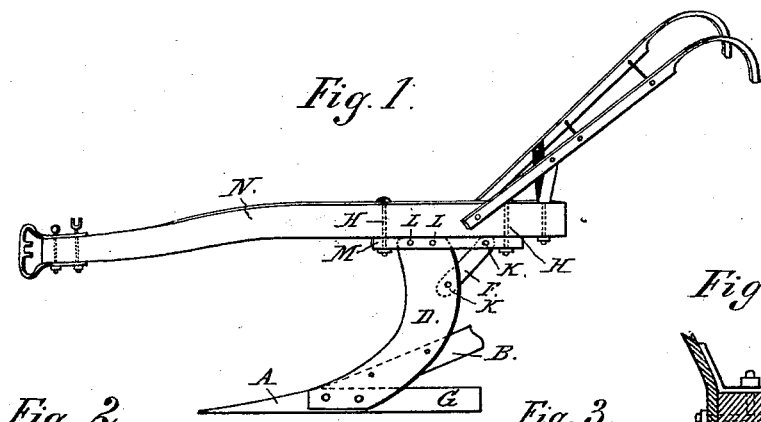
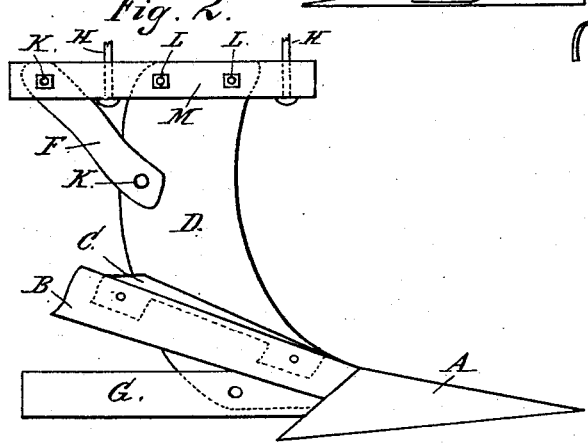
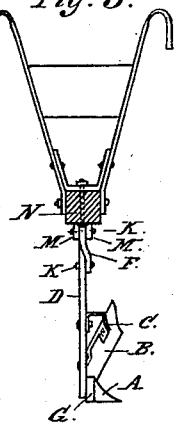
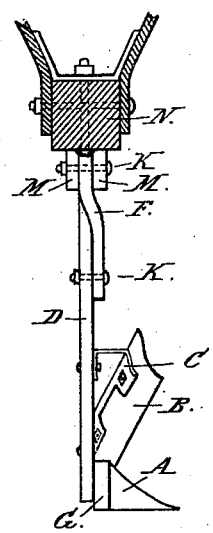
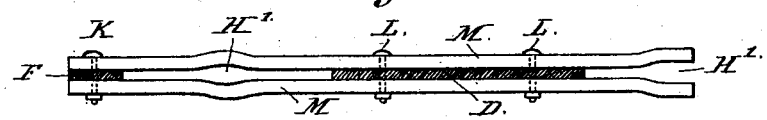
WITNESSES:
Helmuth Holtz
Percy D. Parks
INVENTOR
James Mallon.
BY
W. R. Stringfellow
ATTORNEY.

UNITED STATES PATENT OFFICE.

JAMES MALLON, OF NEW ORLEANS, LOUISIANA.

SUBSOIL-PLOW.

SPECIFICATION forming part of Letters Patent No. 453,887, dated June 9, 1891.

Application filed March 24, 1890. Renewed February 18, 1891. Serial No. 381,804. (No model.)

*To all whom it may concern:*

Be it known that I, JAMES MALLON, a citizen of the United States, residing at New Orleans, in the parish of Orleans and State of Louisiana, have invented certain new and useful Improvements in a Subsoil-Plow; and I do declare the following to be a full, clear, and exact description of the invention, such as will enable others skilled in the art to which it appertains to make and use the same.

My invention relates to an improvement in a subsoil-plow, and its novelty will be fully understood when taken in connection with the annexed drawings; and the objects of my invention are to provide an attachment to a plow that will prevent a vacuum being created and reduce motor or pulling power for working a plow. I attain these objects by the mechanism illustrated in the accompanying drawings, in which—

Figure 1 is a side view showing landside of plow. Fig. 2 is a side view of plow detached from beam, showing mold-board, standard, and cap. Fig. 3 is a rear view. Fig. 4 is a sectional rear view. Fig. 5 is a top view of standard-cap.

Similar letters refer to similar parts throughout the several views.

In the drawings, A refers to the plow-point; B, a mold-board, which is concave on its outer side and which permits a free circulation of air under same, and is held in position by means of frog C, the latter being attached to standard D by suitable bolts.

F is a brace extending from standard-cap M to standard-cap D, and is held in position by bolts K, G being a landside of plow.

H are bolts, which extend through openings H' in standard-cap M and enable the latter to be securely attached to beam N, bolts L L securing standard D to cap M.

The mode of operation is the same as an ordinary plow, except that when the point A has been inserted in the earth and the loose soil raised by means of the pressure of the air circulating through the concave opening on the outer side the resistance is reduced fully fifty per cent. and the farmer enabled to cultivate his land with a less number of animals.

Having described my invention, what I claim, and desire to secure by Letters Patent, is—

In a plow, substantially as described, the combination, with the standard and beam, of the mold-board B, concave on its outer side, the frog C, connecting the mold-board to the standard, as shown, the brace F, the cap M, the land side-piece G, and bolts for connecting the parts, substantially as specified.

In testimony whereof I affix my signature in presence of two witnesses.

JAMES MALLON.

Witnesses:
PERCY D. PARKS,
MICHEL DE COURSEY.